March 12, 1963    P. J. W. JOCHEMS    3,080,640
METHOD OF MANUFACTURING SEMI-CONDUCTIVE ELECTRODE SYSTEMS
Filed Oct. 31, 1958

INVENTOR
PIETER JOHANNES WILHELMUS JOCHEMS
BY
AGENT

United States Patent Office 3,080,640
Patented Mar. 12, 1963

3,080,640
METHOD OF MANUFACTURING SEMI-CONDUCTIVE ELECTRODE SYSTEMS
Pieter Johannes Wilhelmus Jochems, Eindhoven, Netherlands, assignor to North American Philips Company, Inc., New York, N.Y., a corporation of Delaware
Filed Oct. 31, 1958, Ser. No. 771,106
Claims priority, application Netherlands Nov. 5, 1957
5 Claims. (Cl. 29—155.5)

This invention relates to methods of manufacturing semi-conductive electrode systems, such as transistors and crystal diodes, which comprise a small semi-conductive disc, one surface of which is secured to a carrier or support.

This securing is usually effected by soldering, but it is alternatively possible to use hardening binders.

It is common practice to manufacture such small semi-conductive discs by sawing slices from a comparatively large crystal, dividing the slices into strips and sawing small discs from the strips.

Such discs have a thickness of about 100 microns and their length and width may be several millimetres. In the manufacture of the electrode systems, a plurality of such discs are usually laid in a template or jig, the base and the emitter electrodes then being secured thereto by fusion. During this operation, it is difficult to handle the discs on account of their small size.

According to the invention, an object of which is inter alia to obviate this disadvantage, a plurality of carriers are secured, more particularly soldered, to separate parts of a semi-conductive disc, causing said parts to be strengthened, whereupon the discs is broken between the carriers. The disc preferably has the shape of a strip. By the work "broken" is meant a process of severing the parts which are soldered to the carriers by applying a force to those parts to such extent that the strength of the material between those parts is exceeded. Since said parts are strengthened by being secured to carriers there will be a marked difference in strength of said parts and those which are not sustained by carriers. The latter parts, however, may be weakened by cutting a groove into them, for instance by means of a diamond. This method should not be confused with dicing or sawing processes, where a narrow strip of the material is removed completely.

In order that the invention may be readily carried into effect, one embodiment will now be described in detail, by way of example, with reference to the accompanying drawing, in which.

Figure 1:
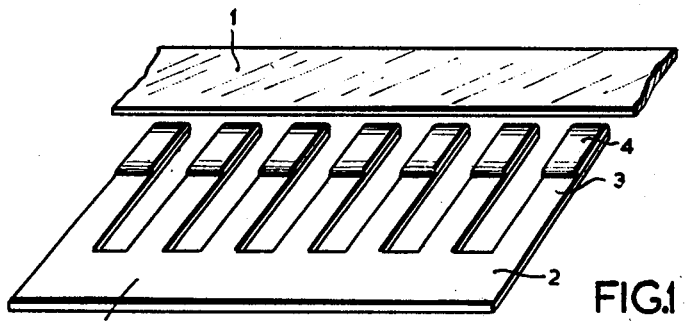
FIGURES 1 and 2 are perspective views of two stages in the manufacture of a transistor.
Figure 2:
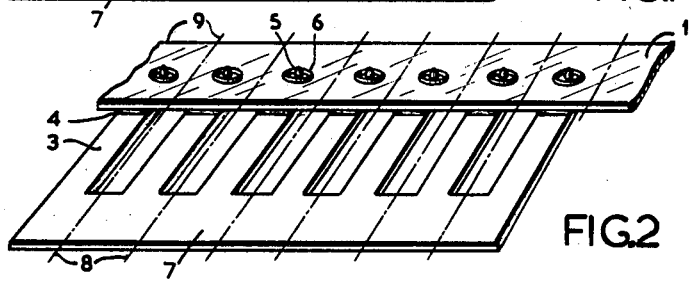
Figure 3:
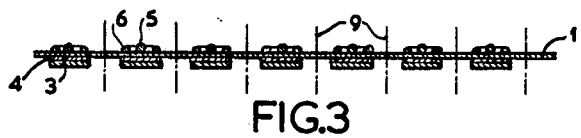
FIG. 3 is a sectional view of a disc with carriers as shown in FIG. 2.

Referring now to FIG. 1, reference numeral 1 indicates a self-supporting strip of monocrystalline germanium obtained by sawing thin slices from a rod-like monocrystal and dividing the slices into narrow strips. Their length may be, for example, 30 millimetres, their width 2 millimetres and their thickness 100 microns. Beneath the strip is a comb-like part 2 made of nickel of 100 microns thick and having ten teeth or carriers 3, the ends of which are covered with a quantity of tin 4. The strip 1 and the comb 2, if desired supported by a template (not shown), may be introduced into an oven and sealed together in surroundings of an inert or reducing gas. Other electrodes, such as an emitter pellet 5 and a base ring 6, may be provided by fusion on the germanium over each carrier 3 either at the same time, before or in a subsequent treament. Now, the ridge 7 of the comb is cut through along the dash-dot lines 8. At the same time or subsequently the strip of germanium 1 is broken approximately along the dash-dot lines 9. As may be seen from FIG. 3, the strip 1 is materially strengthened at the areas on which the carriers 3 are soldered, so that the rupture of the monocrystalline strip in by far the most cases follows the portion of the crystal which is not covered by solder. However, as mentioned above, those portions might be weakened by making a groove into them, i.e. by means of a diamond.

It will be evident that the use of the above-described comb is not essential to the invention. It is as well possible to secure a plurality of separate carriers or supports against the strip 1 and then break it. The invention is neither limited to the electrical properties of the junction between the carriers and the semi-conductive body, which junction may be rectifying, if desired. Neither is the invention limited to the number, shape and properties of other electrodes or contacts provided on this body. Of course, it is not allowed for them to strengthen those parts which are located between the parts of the semi-conductive body covered with solder or binder 4 to an extent such that the ruptures would not follow the first-mentioned parts.

Figure 4:
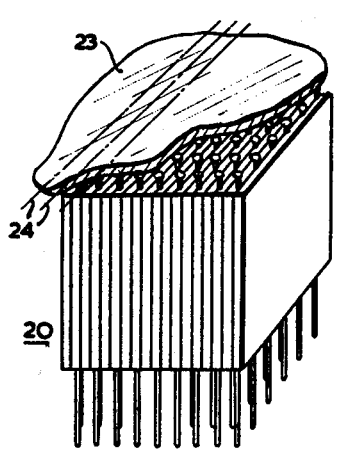
FIG. 4 is a perspective view of a device for manufacturing crystal diodes.
Figure 5:
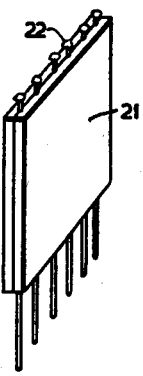
FIGURES 5 to 7 show details of the device of FIG. 4.
Figure 6:
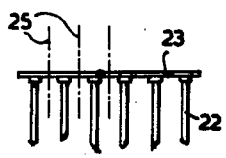
Figure 7:
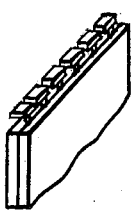

In a similar manner, it is possible to arrange small semi-conductive bodies on the extremities of rod-like carriers. For this purpose, as shown in FIG. 4, use may be made of a holder 20 comprising a stack of flat holders 21 (see FIG. 5) in which a series of carriers or supports 22 are clamped in position. These carriers have flat, tinplated upper ends. All these upper ends are located in one plane, a thin slice 23, consisting of monocrystalline germanium, being soldered on top thereof. Subsequently, the holders 21 are individually removed from the stack 20, the slice 23 during this operation being broken along the dash-dot lines 24. After opening a holder 21, a strip of semi-conductive material having a plurality of carriers is obtained, as shown in FIG. 6. This strip may be broken along the lines 25. It is usually desirable, of course, that the non-covered parts of the slice 23 are narrow and straight, in order that the breaking stress is concentrated insuch parts during breaking. It is therefore preferable to provide the carriers 22 with rectangular heads which leave only small interspaces (see FIG. 7).

What is claimed is:

1. A method of making plural semiconductor assemblies for use in semi-conductor devices, comprising the steps of providing a comb-like electrically conductive sheet having a plurality of carrier portions, soldering a thin flat strip of brittle semiconductive material to the carrier portions in such a manner that the carriers underline the entire width of the strip, severing the underlying sheet to separate the carrier portions, and breaking the semiconductive strip material along a series of spaced directions approximately perpendicular to the lengthwise dimension of the strip, said directions falling between the underlying carrier portions.

2. A method of making plural semiconductor assemblies for use in semiconductor devices, comprising the steps of providing a comb-like electrically conductive metal sheet having a plurality of carrier portions, soldering a thin flat strip of brittle semiconductive material to the carrier portions in such a manner that the carriers underlie substantially the entire width of the strip, severing the underlying sheet to separate the carrier portions thereon, and breaking the semiconductive strip material along a series of spaced planes substantially perpendicular to the lengthwise dimension of the strip, said planes falling between the underlying carrier portions, thereby to form plural semiconductor assemblies each constituted of a carrier portion soldered to a semiconductor portion.

3. A method as set forth in claim 2 wherein contacts are secured to the opposite surface of the strip at portion overlying the carrier portions before the severing and breaking steps.

4. A method of making plural semiconductor assemblies for use in semiconductor devices, comprising the steps of providing a series of rod-like carriers having flat upper ends, clamping the carriers in a holder so that the flat upper ends lie in a common plane, soldering a thin slice of semiconductive material on top of this group of flat ends, and breaking the semiconductive material along the unsupported areas between the flat ends.

5. A method of making plural semiconductor assemblies for use in semiconductor devices, comprising the steps of providing a series of rod-like carriers having enlarged flat upper ends, clamping the carriers in a holder so that the flat upper ends lie in a common plane, soldering a thin slice of semiconductive material on top of this group of flat ends, unclamping the carriers, and breaking the semiconductive material along the unsupported areas between the flat ends to form plural semiconductor asasemblies each constituted of a carrier soldered to a semiconductor portion.

References Cited in the file of this patent
UNITED STATES PATENTS

| | | |
|---|---|---|
| 2,339,072 | Herzog et al. | Jan. 11, 1944 |
| 2,344,931 | Herzog et al. | Mar. 21, 1944 |
| 2,365,698 | Haigh | Dec. 26, 1944 |
| 2,670,530 | Regnier | Mar. 2, 1954 |
| 2,743,506 | Solow | May 1, 1956 |
| 2,747,257 | Ashcroft et al. | May 29, 1956 |
| 2,865,082 | Gates | Dec. 23, 1958 |
| 2,887,558 | Tally | May 19, 1959 |
| 2,970,730 | Schwarz | Feb. 7, 1961 |

UNITED STATES PATENT OFFICE
CERTIFICATE OF CORRECTION

Patent No. 3,080,640                                           March 12, 1963

Pieter Johannes Wilhelmus Jochems

It is hereby certified that error appears in the above numbered patent requiring correction and that the said Letters Patent should read as corrected below.

Column 1, line 35, for "work" read -- word --; column 2, line 43, for "insuch" read -- in such --; column 3, line 2, for "portion" read -- portions --.

Signed and sealed this 8th day of October 1963.

(SEAL)
Attest:

ERNEST W. SWIDER
Attesting Officer

EDWIN L. REYNOLDS
Acting Commissioner of Patents